(12) United States Patent
Hsieh et al.

(10) Patent No.: US 10,983,063 B2
(45) Date of Patent: Apr. 20, 2021

(54) BIOSENSING SYSTEM WITH SELF-COMPENSATION

(71) Applicant: NATIONAL CHUNG CHENG UNIVERSITY, Minsyong Township (TW)

(72) Inventors: Wen-Hsin Hsieh, Minsyong Township (TW); Hsun-Yuan Li, Minsyong Township (TW); Yan-Chang Lee, Minsyong Township (TW); Yu-Hsing Lai, Minsyong Township (TW)

(73) Assignee: National Chung Cheng University, Chiayi County (TW)

( * ) Notice: Subject to any disclaimer, the term of this patent is extended or adjusted under 35 U.S.C. 154(b) by 0 days.

(21) Appl. No.: 16/574,363

(22) Filed: Sep. 18, 2019

(65) Prior Publication Data

US 2020/0340924 A1 Oct. 29, 2020

(30) Foreign Application Priority Data

Apr. 29, 2019 (TW) ............................... 108114912.0

(51) Int. Cl.
*G01N 21/77* (2006.01)
*G02B 6/34* (2006.01)
(Continued)

(52) U.S. Cl.
CPC ......... *G01N 21/7743* (2013.01); *G02B 6/124* (2013.01); *G02B 6/34* (2013.01); *G06F 17/18* (2013.01); *H05B 45/10* (2020.01)

(58) Field of Classification Search
CPC ......... G01N 21/7743; G01N 33/54373; G01N 21/253; G01N 21/4788; G01N 21/554;
(Continued)

(56) References Cited

U.S. PATENT DOCUMENTS 6,483,096 B1 * 11/2002 Kunz ................. G01N 21/6428
250/214 R
7,233,396 B1 * 6/2007 Hall ..................... G01N 21/552
356/369
(Continued)

FOREIGN PATENT DOCUMENTS

CN 103827640 A 5/2014
TW 200935042 A 8/2009
(Continued)

OTHER PUBLICATIONS

Search Report appended to an Office Action, which was issued to Taiwanese counterpart application No. 108114912 by the TIPO dated Nov. 15, 2019 (2 pages, English translation included).

*Primary Examiner* — Isiaka O Akanbi
(74) *Attorney, Agent, or Firm* — Michael Best & Friedrich LLP

(57) ABSTRACT

A biosensing system includes a biosensor, a light source, first and second photodetectors, and a calculator. The light source is disposed to irradiate the biosensor, so as to generate two or more of a coupled light beam, a reflected light beam, a transmitted light beam and a diffracted light beam. The first photodetector is disposed to measure an intensity of one of the generated light beams that is indicative of an effect of an analyte on light to obtain a first intensity value. The second photodetector is disposed to measure an intensity of another one of the generated light beams that is indicative of an effect of the analyte on light to obtain a second intensity value. The calculator performs compensation calculation based at least on the first and second intensity values.

7 Claims, 5 Drawing Sheets

(51) Int. Cl.
*G06F 17/18* (2006.01)
*G02B 6/124* (2006.01)
*H05B 45/10* (2020.01)

(58) Field of Classification Search
CPC .. G01R 33/093; G01R 33/1269; H05B 45/10; G02B 6/124; G02B 6/34; G06F 17/18
USPC ....... 356/334, 328, 448, 445, 446, 432, 435, 356/442
See application file for complete search history.

(56) References Cited

U.S. PATENT DOCUMENTS

| | | | | |
|---|---|---|---|---|
| 2002/0054290 | A1* | 5/2002 | Vurens | G01J 4/04 356/369 |
| 2006/0023221 | A1* | 2/2006 | Kimura | G01N 21/553 356/445 |
| 2006/0119859 | A1* | 6/2006 | Su | G01N 21/21 356/495 |
| 2008/0002212 | A1* | 1/2008 | Kawasaki | G01B 9/02028 356/512 |
| 2013/0023042 | A1* | 1/2013 | Chang | G01N 33/54373 435/288.7 |
| 2013/0085352 | A1* | 4/2013 | Martini | A61B 5/14532 600/316 |
| 2015/0338402 | A1* | 11/2015 | Lakowicz | G01N 21/6428 506/9 |
| 2018/0017493 | A1* | 1/2018 | Nakamura | G01J 3/0224 |

FOREIGN PATENT DOCUMENTS

| | | |
|---|---|---|
| TW | 201305549 A1 | 2/2013 |
| TW | 201812642 A | 4/2018 |

\* cited by examiner

BIOSENSING SYSTEM WITH SELF-COMPENSATION

CROSS-REFERENCE TO RELATED APPLICATION

This application claims priority of Taiwanese Patent Application No. 108114912, filed on Apr. 29, 2019.

FIELD

The disclosure relates to a biosensing system, and more particularly to a biosensing system with self-compensation.

BACKGROUND

Optical biosensors can be used to achieve high detection accuracy and convenience. With the advance of waveguides, grating waveguide biosensors are receiving more and more attention.

A conventional grating waveguide biosensor uses a grating as a coupling element to couple a light beam into a waveguide layer of the biosensor. For the purpose of detection, the intensity, angle or wavelength of the light beam that exits the waveguide layer is measured. However, the measured intensity generally contains unstable interference, adversely affecting detection sensitivity.

SUMMARY

Therefore, an object of the disclosure is to provide a biosensing system that can alleviate the drawback of the prior art.

According to the disclosure, the biosensing system includes biosensor, light source, a first photodetector, a second photodetector and a calculator. The light source is disposed to irradiate the biosensor, so as to generate at least two of a coupled light beam, a reflected light beam, a transmitted light beam or a diffracted light beam. The first photodetector is disposed to measure an intensity of a first light beam to obtain a first intensity value. The first light beam is one of the coupled light beam, the reflected light beam, the transmitted light beam and the diffracted light beam that is generated and that is indicative of an effect of an analyte on light. The second photodetector is disposed to measure an intensity of a second light beam to obtain a second intensity value. The second light beam is another one of the coupled light beam, the reflected light beam, the transmitted light beam and the diffracted light beam that is generated and that is indicative of an effect of the analyte on light. The calculator is connected to the first and second photodetectors for receiving the first and second intensity values respectively therefrom, and performs compensation calculation based at least on the first and second intensity values.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
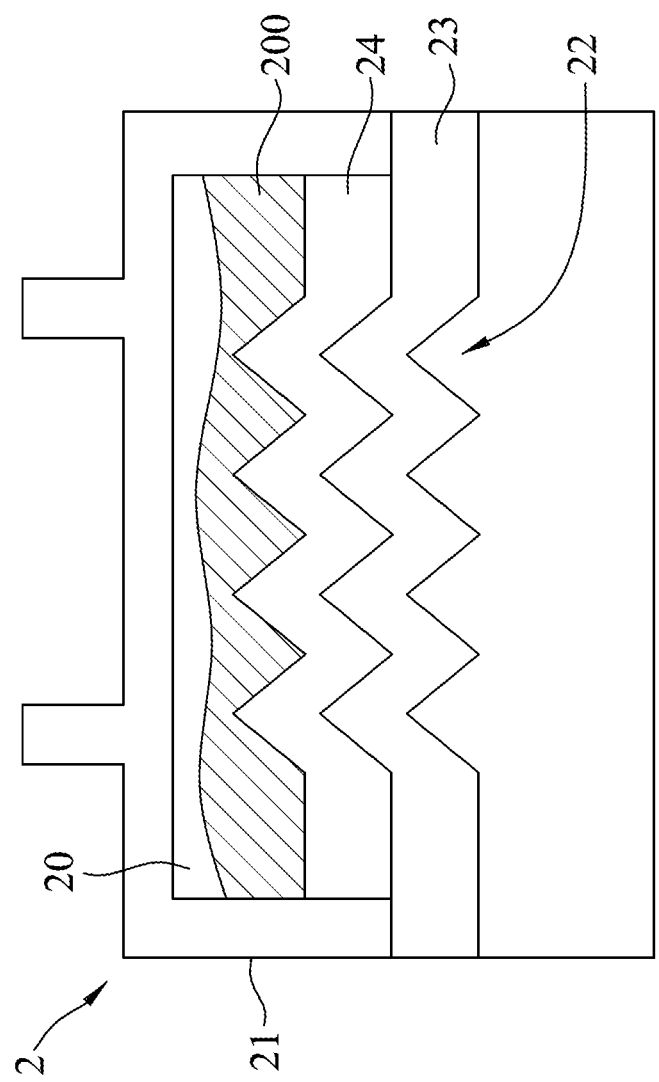
FIG. 1 is a schematic diagram illustrating a biosensor of an embodiment of a biosensing system according to the disclosure.
Figure 2:
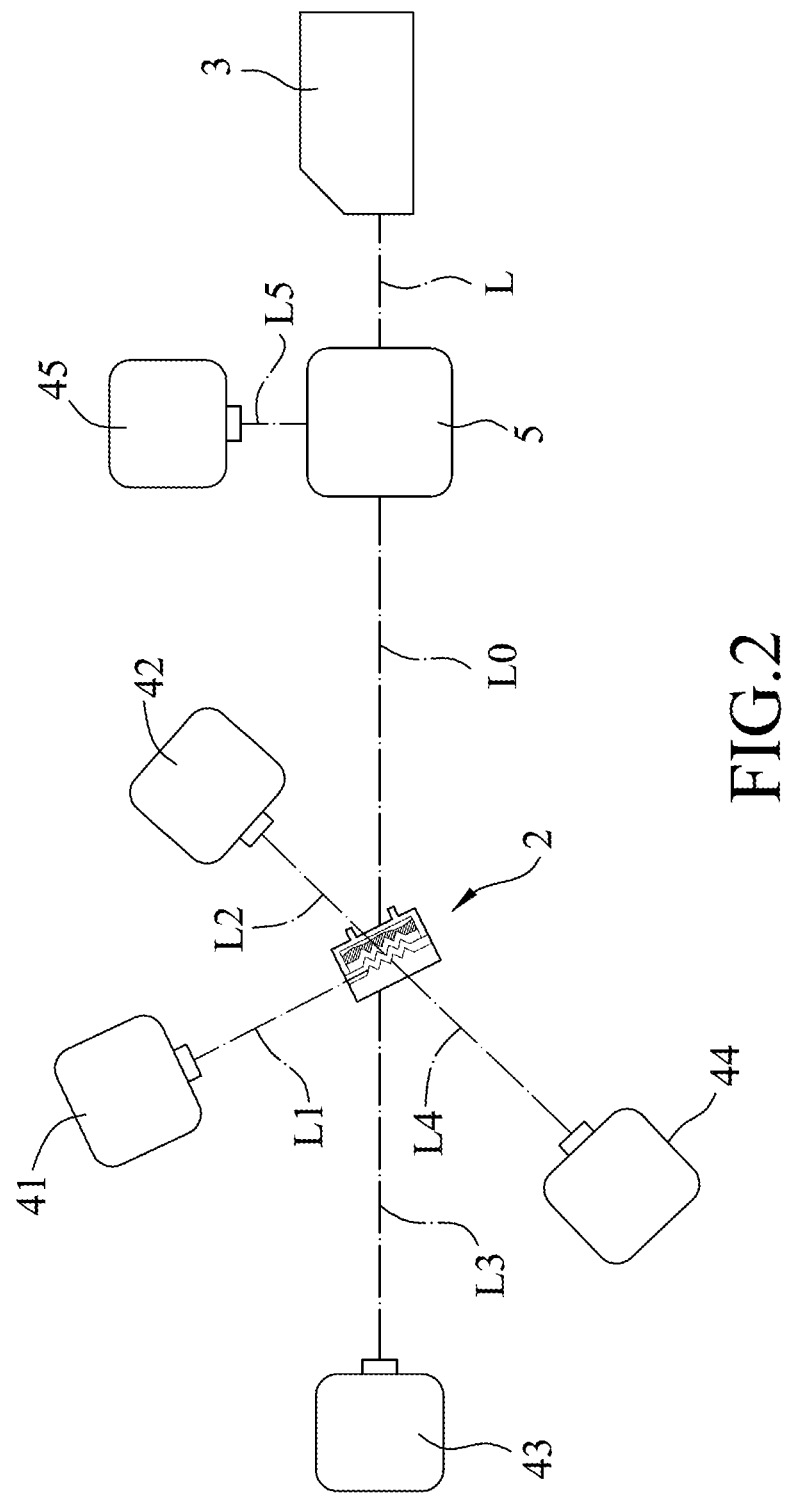
FIG. 2 is a schematic diagram illustrating the embodiment.
Figure 3:
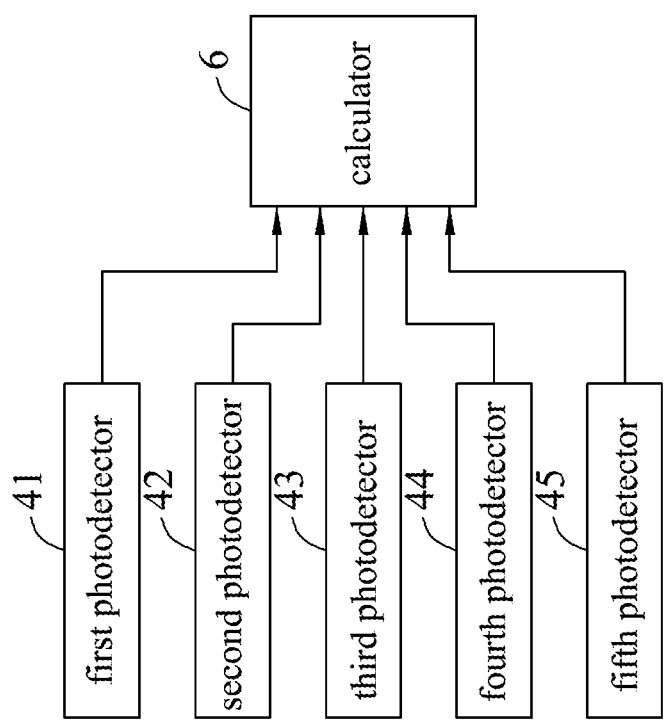
FIG. 3 is a block diagram illustrating the embodiment.

Referring to FIGS. 1, 2 and 3, an embodiment of a biosensing system according to the disclosure includes a biosensor 2, a light source 3, a first photodetector 41, a second photodetector 42, a third photodetector 43, a fourth photodetector 44, a fifth photodetector 45, a splitter 5 and a calculator 6.

In this embodiment, the biosensor 2 is a grating waveguide biosensor, and includes a substrate 21. The substrate 21 is formed with a microchannel 20, and is provided with a grating part 22 and a waveguide layer 23. The waveguide layer 23 is disposed on the grating part 22, and assists in defining the microchannel 20. After disposing a recognition molecule layer 24 on the waveguide layer 23 and in the microchannel 20 and then guiding an analyte 200 into the microchannel 20, a biological detection can be conducted. The recognition molecule layer 24 contains molecules (e.g., antibodies) that can interact with a target (e.g., antigens) in the analyte 200 (e.g., perform molecular recognition with the target). By virtue of the structures of the grating part 22 and the waveguide layer 23, a property (e.g., a refractive index) of the analyte 200 can be detected, regardless of the presence or absence of the recognition molecule layer 24.

The light source 3 is disposed to emit a source light beam (L) toward the biosensor 2. In this embodiment, the light source 3 is a laser generator that emits a laser beam to serve as the source light beam (L), but in other embodiments, the light source 3 may be a light emitting diode that emits a light beam to serve as the source light beam (L).

The splitter 5 is disposed between the light source 3 and the biosensor 2, and splits the source light beam (L) into a first split light beam (L0) that travels toward the biosensor 2 and a second split light beam (L5).

In this embodiment, the biosensor 2 splits the first split light beam (L0) into a coupled light beam (L1), a reflected light beam (L2), a transmitted light beam (L3) and a diffracted light beam (L4). However, in other embodiments, the biosensor 2 may split the first split light beam (L0) into only two or three of the above-mentioned light beams (L1-L4), instead of all of them. The coupled light beam (L1) refers to a component of the first split light beam (L0) that is coupled into the waveguide layer 23 of the biosensor 2, that propagates along the waveguide layer 23, and that exits the waveguide layer 23. The reflected light beam (L2) refers to a component of the first split light beam (L0) that is reflected by the biosensor 2. The transmitted light beam (L3) refers to a component of the first split light beam (L0) that penetrates the biosensor 2 without path alteration along the way. The diffracted light beam (L4) refers to a component of the first split light beam (L0) that is diffracted by the biosensor 2 when traveling therethrough.

Moreover, in this embodiment, each of the coupled light beam (L1), the reflected light beam (L2), the transmitted light beam (L3) and the diffracted light beam (L4) is indicative of the effect of the analyte 200 on the first split light beam (L0), so all of them can be used to analyze the property of the analyte 200.

The first to fourth photodetectors 41-44 are disposed to respectively measure intensities of the coupled light beam (L1), the reflected light beam (L2), the transmitted light beam (L3) and the diffracted light beam (L4). In this embodiment, the first photodetector 41 is disposed to detect the intensity of the coupled light beam (L1) to obtain a first intensity value of $I_{L1}$, the second photodetector 42 is disposed to detect the intensity of the reflected light beam (L2) to obtain a second intensity value of $I_{L2}$ the third photodetector 43 is disposed to detect the intensity of the transmitted light beam (L3) to obtain a third intensity value of $I_{L3}$, and the fourth photodetector 44 is disposed to detect the intensity of the diffracted light beam (L4) to obtain a fourth intensity value of $I_{L4}$.

The fifth photodetector 45 is disposed to measure an intensity of the second split light beam (L5) to obtain a fifth intensity value of $I_{L5}$.

The calculator 6 is connected to the first to fifth photodetectors 41-45 for receiving the first to fifth intensity values respectively therefrom, and performs compensation calculation based on the first to fifth intensity values to obtain a plurality of compensated intensity values in which the presence of unstable interference is less pronounced as compared to the first to fourth intensity values, thereby increasing detection sensitivity of the biosensing system.

In this embodiment, the compensated intensity values include, for example, a result of dividing the second intensity value by the first intensity value (i.e., $I_{L2}/I_{L1}$), a result of dividing the third intensity value by the first intensity value (i.e., $I_{L3}/I_{L1}$), a result of dividing the second intensity value by the third intensity value (i.e., $I_{L2}/I_{L3}$), a result of dividing the second intensity value by the fourth intensity value (i.e., $I_{L2}/I_{L4}$), a result of dividing the first intensity value by the fourth intensity value (i.e., $I_{L1}/I_{L4}$), and a result of dividing the third intensity value by the fourth intensity value (i.e., $I_{L3}/I_{L4}$). The unstable interference from an environment external to the biosensor 2 is less evident in the aforesaid results (i.e., $I_{L2}/I_{L1}$, $I_{L3}/I_{L1}$, $I_{L2}/I_{L3}$, $I_{L2}/I_{L4}$, $I_{L1}/I_{L4}$ and $I_{L3}/I_{L4}$), and so the aforesaid results, in comparison to the original intensity values, better represent the effects of the analyte 200 on light (i.e., enhanced sensitivity). In addition, the compensated intensity values may further include at least one of a result of dividing the first intensity value by the fifth intensity value (i.e., $I_{L1}/I_{L5}$), a result of dividing the second intensity value by the fifth intensity value (i.e., $I_{L2}/I_{L5}$), a result of dividing the third intensity value by the fifth intensity value (i.e., $I_{L3}/I_{L5}$), or a result of dividing the fourth intensity value by the fifth intensity value (i.e., $I_{L4}/I_{L5}$). Unstable interference from the light source 3 (i.e., unstable intensity of the source light beam (L)) is less apparent in the aforesaid results (i.e., $I_{L1}/I_{L5}$, $I_{L2}/I_{L5}$, $I_{L3}/I_{L5}$ and $I_{L4}/I_{L5}$).

It should be noted that, the compensation calculation performed for any two of the first to fourth intensity values (also referred to as a first target intensity value and a second target intensity value) (e.g., the first intensity value of $I_{L1}$ and the second intensity value of $I_{L2}$) may be one of the following, and is not limited to the example described above: (a) dividing the first target intensity value by the second target intensity value (i.e., or $I_{L1}/I_{L2}$ or $I_{L2}/I_{L1}$); (b) subtracting the first target intensity value from the second target intensity value (i.e., $I_{L1}-I_{L2}$ or $I_{L2}-I_{L1}$); (c) multiplying the first target intensity value by a predetermined first coefficient of n, multiplying the second target intensity value by a predetermined second coefficient of m that may be different from the first coefficient, and dividing a product of the first target intensity value and the first coefficient by a product of the second target intensity value and the second coefficient (i.e., $(n \times I_{L1})/(m \times I_{L2})$ or $(n \times I_{L2})/(m \times I_{L1})$); (d) multiplying the first target intensity value by a predetermined first coefficient of n, multiplying the second target intensity value by a predetermined second coefficient of m that may be different from the first coefficient, and subtracting a product of the first target intensity value and the first coefficient from a product of the second target intensity value and the second coefficient (i.e., $m \times I_{L1} - n \times I_{L2}$ or $m \times I_{L2} - n \times I_{L1}$); (e) normalizing the first and second target intensity values, and dividing the normalized first target intensity value by the normalized second target intensity value (i.e., $(I_{L1}/I_{10})/(I_{L2}/I_{20})$ or $(I_{L2}/I_{20})/(I_{L1}/I_{10})$); and (f) normalizing the first and second target intensity values, and subtracting the normalized first target intensity value from the normalized second target intensity value (i.e., $I_{L1}/I_{10} - I_{L2}/I_{20}$ or $I_{L2}/I_{20} - I_{L1}/I_{10}$), wherein $I_{s0}$ (e.g., $I_{10}$) may be the intensity value obtained at a predetermined time point (e.g., the first second) for the light beam "s", or an average of the intensity values obtained during a predetermined time period for the light beam "s", where $1 \le s \le 4$, where light beam "1" means the coupled light beam (L1), light beam "2" means the reflected light beam (L2), light beam "3" means the transmitted light beam (L3), and light beam "4" means the diffracted light beam (L4), but the disclosure is not limited thereto.

The design and the operation of the biosensing system of this embodiment are described in more detail below.

The light source 3 emits the source light beam (L) that has a predetermined frequency and that is collimated. The source light beam (L) reaches the splitter 5, and is split by the splitter 5 into the first and second split light beams (L0, L5). An intensity ratio of the first and second split light beams (L0, L5) can be designed as desired. The first split light beam (L0) reaches the biosensor 2, and is split by the biosensor 2 into the coupled light beam (L1), the reflected light beam (L2), the transmitted light beam (L3) and the diffracted light beam (L4). An intensity ratio of the coupled light beam (L1), the reflected light beam (L2), the transmitted light beam (L3) and the diffracted light beam (L4) in the absence of the analyte 200 in the microchannel 20 can be designed as desired. In an example, before injecting the analyte 200 into the biosensor 2, the intensity of each of the coupled light beam (L1), the reflected light beam (L2), the transmitted light beam (L3) and the diffracted light beam (L4) is 25% of the intensity of the first split light beam (L0); and after the analyte 200 is injected into the biosensor 2, the intensities of the coupled light beam (L1), the reflected light beam (L2), the transmitted light beam (L3) and the diffracted light beam (L4) deviate from 25% and become, for example, 12.5%, 37.5%, 35% and 15% of the intensity of the first split light beam (L0). Therefore, the existence of the analyte 200 in the biosensor 2 can be determined based on the intensities of the coupled light beam (L1), the reflected light beam (L2), the transmitted light beam (L3) and the diffracted light beam (L4).

In the aforesaid example, when the intensity of the source light beam (L) is five and the intensity ratio of the first and second split light beams (L0, L5) is 4:1, the first to fifth intensity values and some of the compensated intensity values for cases with or without the presence of the analyte 200 in the biosensor 2 and their percent deviations (relative change in percentage) are listed in Table 1 below. In Table 1, the relative change in response to the addition of the analyte 200 for the corresponding intensity value is calculated by $(I_2-I_1)/I_1 \times 100\%$, where $I_1$ represents an intensity value corresponding to the case where no analyte 200 is injected in the biosensor 2, and $I_2$ represents an intensity value corresponding to the case where the biosensor 2 has the analyte 200 in the microchannel 20. As seen in Table 1, for instance, the intensity value $I_{L1}$ for the coupled light beam (L1) obtained for the case with the analyte being present is 0.5, and the compensated intensity value of $I_{L3}/I_{L1}$ obtained for the case with the analyte being present is 2.8.

TABLE 1

|  | $I_{L5}$ | $I_{L1}$ | $I_{L2}$ | $I_{L3}$ | $I_{L4}$ | $I_{L2}/I_{L1}$ |
|---|---|---|---|---|---|---|
| Without Analyte | 1 | 1 | 1 | 1 | 1 | 1 |
| With Analyte | 1 | 0.5 | 1.5 | 1.4 | 0.6 | 3 |
| Relative Change | 0% | −50% | 50% | 40% | −40% | 200% |

|  | $I_{L3}/I_{L1}$ | $I_{L2}/I_{L3}$ | $I_{L2}/I_{L4}$ | $I_{L1}/I_{L4}$ | $I_{L3}/I_{L4}$ |
|---|---|---|---|---|---|
| Without Analyte | 1 | 1 | 1 | 1 | 1 |
| With Analyte | 2.8 | 1.07 | 2.5 | 0.83 | 2.3 |
| Relative Change | 180% | 7% | 150% | −17% | 130% |

Figure 4:
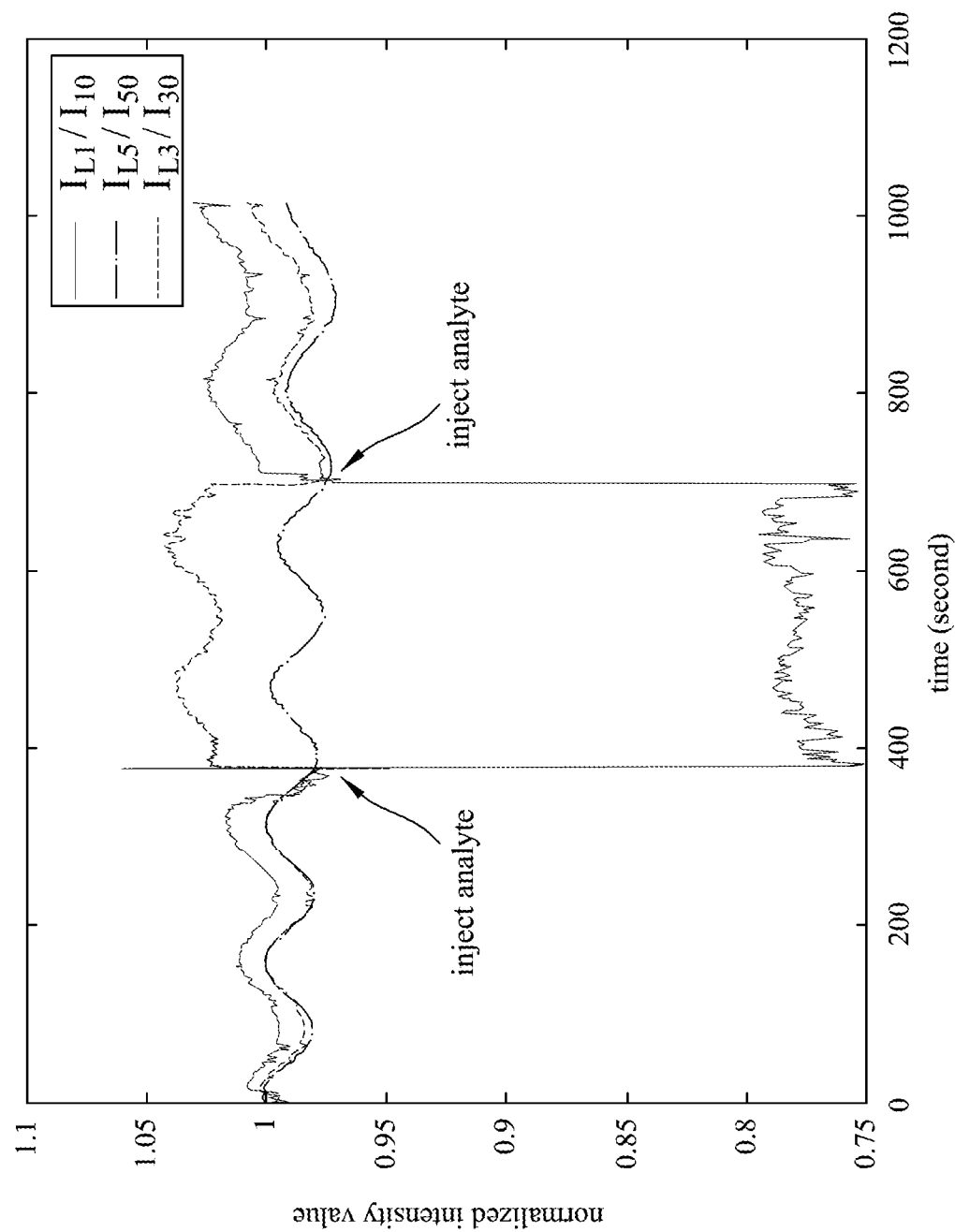
FIG. 4 is a plot illustrating normalized intensity values respectively corresponding to a coupled light beam, a transmitted light beam and a second split light beam of the embodiment.
Figure 5:
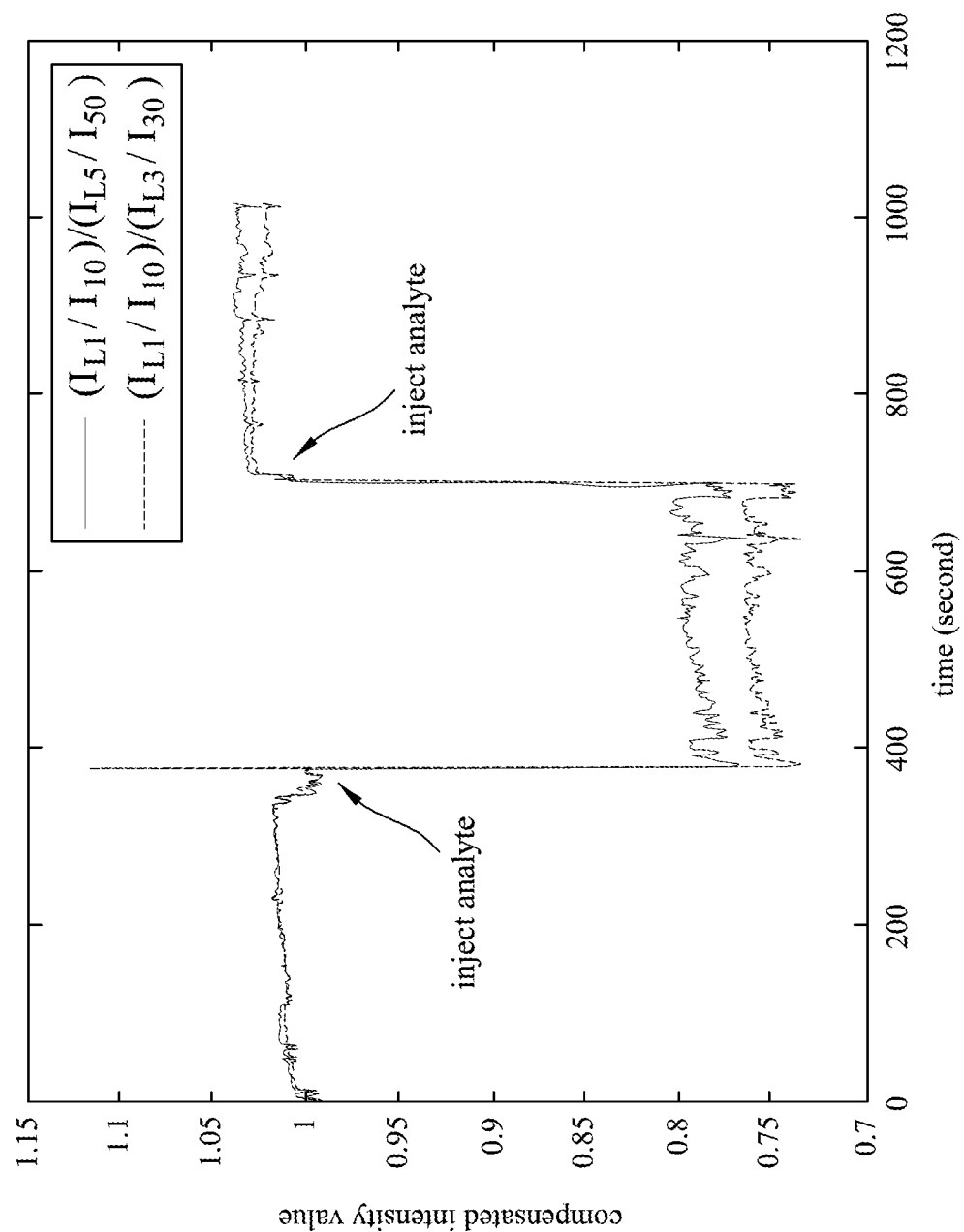
FIG. 5 is a plot illustrating compensated intensity values related to the coupled light beam, the transmitted light beam and the second split light beam.

FIGS. 4 and 5 are exemplary timing diagrams of the biosensing system of this embodiment. In FIG. 4, the normalized first, third and fifth intensity values (i.e., $I_{L1}/I_{10}$, $I_{L3}/I_{30}$ and $I_{L5}/I_{50}$) are depicted. In FIG. 5, compensated intensity values obtained using the normalized first, third and fifth intensity values (e.g., $(I_{L1}/I_{10})/(I_{L3}/I_{30})$ and $(I_{L1}/I_{10})/(I_{L5}/I_{50})$) are depicted. Because of the unstable intensity of the source light beam (L), the intensity of each of the coupled light beam (L1), the transmitted light beam (L3) and the second split light beam (L5) fluctuates as shown in FIG. 4. On the other hand, the effect of the unstable intensity of the source light beam (L) on the compensated intensity value that is obtained from dividing the normalized first intensity value by the normalized fifth intensity value (i.e., $(I_{L1}/I_{10})/(I_{L5}/I_{50})$) is significantly reduced as shown in FIG. 5. In addition, as shown in FIG. 4, upon the injection of the analyte 200, the intensities of the coupled light beam (L1) and the transmitted light beam (L3) deviate in opposite directions. The compensated intensity value that is obtained from dividing the normalized first intensity value by the normalized third intensity value (i.e., $(I_{L1}/I_{10})/(I_{L3}/I_{30})$) shows little sign of the unstable interference from the environment external of the biosensor 2, and exaggerates the deviation as shown in FIG. 5, thereby increasing the detection sensitivity.

In view of the above, in this embodiment, by performing compensation calculation for any two of the first to fourth intensity values, the compensated intensity values thus obtained can reduce the effects of the unstable interference from the environment external of the biosensor 2 as compared to the first to fourth intensity values (without compensation), thereby increasing the detection sensitivity. In addition, by performing compensation calculation for the fifth intensity value and any one of the first to fourth intensity values, the compensated intensity value thus obtained can reduce the effects of the unstable intensity of the source light beam (L).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A biosensing system comprising:
   a biosensor;
   a light source disposed to irradiate said biosensor, so as to generate at least two of a coupled light beam, a reflected light beam, a transmitted light beam or a diffracted light beam;
   a first photodetector disposed to measure an intensity of a first light beam to obtain a first intensity value, the first light beam being a first type of light beam selected from the group consisting of the coupled light beam, the reflected light beam, the transmitted light beam and the diffracted light beam that is generated and that is indicative of an effect of an analyte on light;
   a second photodetector disposed to measure an intensity of a second light beam to obtain a second intensity value, the second light beam being a second type of light beam selected from the group consisting of the coupled light beam, the reflected light beam, the transmitted light beam and the diffracted light beam that is generated and that is indicative of an effect of the analyte on light, the second type of light beam being different from the first type of light beam; and
   a calculator connected to said first and second photodetectors for receiving the first and second intensity values respectively therefrom, and performing compensation calculation based at least on the first and second intensity values;
   wherein the compensation calculation is performed on the first and second intensity values in the following:
   multiplying the first intensity value by a predetermined first coefficient, multiplying the second intensity value by a predetermined second coefficient different from the first coefficient, and dividing a product of the first intensity value and the first coefficient by a product of the second intensity value and the second coefficient;
   multiplying the first intensity value by a predetermined first coefficient, multiplying the second intensity value by a predetermined second coefficient different from the first coefficient, and subtracting a product of the first intensity value and the first coefficient from a product of the second intensity value and the second coefficient;
   normalizing the first intensity value and the second intensity value, and dividing the normalized first intensity value by the normalized second intensity value; and
   normalizing the first intensity value and the second intensity value, and subtracting the normalized first intensity value from the normalized second intensity value.

2. The biosensing system of claim 1, further comprising a third photodetector, wherein:

at least three of the coupled light beam, the reflected light beam, the transmitted light beam or the diffracted light beam are generated;

said third photodetector is disposed to measure an intensity of a third light beam to obtain a third intensity value, the third light beam being a third type of light beam selected from the group consisting of the coupled light beam, the reflected light beam, the transmitted light beam and the diffracted light beam that is generated and that is indicative of an effect of the analyte on light, the third type of light beam being different from both the first type of light beam and the second type of light beam; and said calculator is connected further to said third photodetector for receiving the third intensity value therefrom, and performs the compensation calculation based further on the third intensity value.

3. The biosensing system of claim 2, further comprising a fourth photodetector, wherein:

all of the coupled light beam, the reflected light beam, the transmitted light beam and the diffracted light beam are generated;

said fourth photodetector is disposed to measure an intensity of a fourth light beam to obtain a fourth intensity value, the fourth light beam being a fourth type of light beam selected from the group consisting of the coupled light beam, the reflected light beam, the transmitted light beam and the diffracted light beam, and being indicative of an effect of the analyte on light, the fourth type of light beam being different from the first type of light beam, the second type of light beam, and the third type of light beam; and said calculator is connected further to said fourth photodetector for receiving the fourth intensity value therefrom, and performs the compensation calculation based further on the fourth intensity value.

4. The biosensing system of claim 3, wherein the compensation calculation is performed for any two of the first to fourth intensity values in one of the following:

dividing a first target intensity value by a second target intensity value;

subtracting a first target intensity value from a second target intensity value;

multiplying a first target intensity value by a predetermined first coefficient, multiplying a second target intensity value by a predetermined second coefficient different from the first coefficient, and dividing a product of the first target intensity value and the first coefficient by a product of the second target intensity value and the second coefficient;

multiplying a first target intensity value by a predetermined first coefficient, multiplying a second target intensity value by a predetermined second coefficient different from the first coefficient, and subtracting a product of the first target intensity value and the first coefficient from a product of the second target intensity value and the second coefficient;

normalizing a first target intensity value and a second target intensity value, and dividing the normalized first target intensity value by the normalized second target intensity value; and normalizing a first target intensity value and a second target intensity value, and subtracting the normalized first target intensity value from the normalized second target intensity value, where the first and second target intensity values are said any two of the first to fourth intensity values, respectively.

5. The biosensing system of claim 1, further comprising a splitter and a fifth photodetector, wherein:

said light source emits a source light beam toward said biosensor;

said splitter is disposed between said light source and said biosensor, and splits the source light beam into a first split light beam that travels toward said biosensor and a second split light beam;

said biosensor splits the first split light beam into the coupled light beam, the reflected light beam, the transmitted light beam and the diffracted light beam;

said fifth photodetector is disposed to measure an intensity of the second split light beam to obtain a fifth intensity value; and said calculator is connected further to said fifth photodetector for receiving the fifth intensity value therefrom, and performs the compensation calculation based further on the fifth intensity value.

6. The biosensing system of claim 1, wherein said biosensor is a grating waveguide biosensor, and includes a substrate that is formed with a microchannel, and that is provided with a grating part and a waveguide layer which is disposed on the grating part and which assists in defining the microchannel.

7. The biosensing system of claim 1, wherein said light source is one of a laser generator and a light emitting diode.

* * * * *